US012659114B2

(12) United States Patent
Echigo et al.

(10) Patent No.: US 12,659,114 B2
(45) Date of Patent: Jun. 16, 2026

(54) TERMINAL, RADIO COMMUNICATION METHOD, AND BASE STATION

(71) Applicant: NTT DOCOMO, INC., Tokyo (JP)

(72) Inventors: Haruhi Echigo, Tokyo (JP); Hiroki Harada, Tokyo (JP); Daisuke Kurita, Tokyo (JP); Yuki Matsumura, Tokyo (JP); Naoya Shibaike, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 299 days.

(21) Appl. No.: 18/552,793

(22) PCT Filed: Mar. 30, 2021

(86) PCT No.: PCT/JP2021/013668
§ 371 (c)(1),
(2) Date: Sep. 27, 2023

(87) PCT Pub. No.: WO2022/208687
PCT Pub. Date: Jun. 10, 2022

(65) Prior Publication Data
US 2024/0187186 A1     Jun. 6, 2024

(51) Int. Cl.
*H04L 5/00*     (2006.01)

(52) U.S. Cl.
CPC .................................. *H04L 5/0051* (2013.01)

(58) Field of Classification Search
None
See application file for complete search history.

(56) References Cited

U.S. PATENT DOCUMENTS

| | | | | |
|---|---|---|---|---|
| 11,483,115 B2 * | 10/2022 | Luo | ....................... | H04W 24/10 |
| 2020/0112355 A1 * | 4/2020 | Park | ................... | H04B 7/0626 |
| 2020/0127722 A1 * | 4/2020 | Kang | .................... | H04L 5/0023 |
| 2021/0067297 A1 * | 3/2021 | Farmanbar | ............ | H04L 5/0096 |
| 2021/0258991 A1 * | 8/2021 | Bao | ..................... | H04L 25/0254 |
| 2022/0045731 A1 * | 2/2022 | Kang | .................... | H04L 5/0048 |
| 2022/0095279 A1 * | 3/2022 | Hwang | .............. | H04L 27/2602 |
| 2022/0103326 A1 * | 3/2022 | Li | ............................ | H04L 5/00 |
| 2022/0109527 A1 * | 4/2022 | Hwang | ................. | H04L 1/1864 |

(Continued)

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)"; Mar. 2010 (149 pages).

(Continued)

*Primary Examiner* — Phirin Sam
(74) *Attorney, Agent, or Firm* — Osha Bergman Watanabe & Burton LLP

(57) ABSTRACT

A terminal according to one aspect of the present disclosure includes a receiving section that receives a channel state information reference signal (CSI-RS), and a control section that performs, by using a machine learning model trained based on first configuration of the CSI-RS, control of performing prediction based on second configuration of the CSI-RS. According to one aspect of the present disclosure, high-accuracy channel estimation, high-efficiency use of resources, and the like can be implemented.

4 Claims, 16 Drawing Sheets

(56) References Cited

U.S. PATENT DOCUMENTS

2022/0322327 A1\* 10/2022 Park ...................... H04L 1/1854
2024/0137097 A1\* 4/2024 Bhamri ................ H04B 7/0626

OTHER PUBLICATIONS

International Search Report issued in PCT/JP2021/013668 on Nov. 2, 2021 (5 pages).
Written Opinion of the International Searching Authority issued in PCT/JP2021/013668 on Nov. 2, 2021 (3 pages).

\* cited by examiner

FIG. 6A

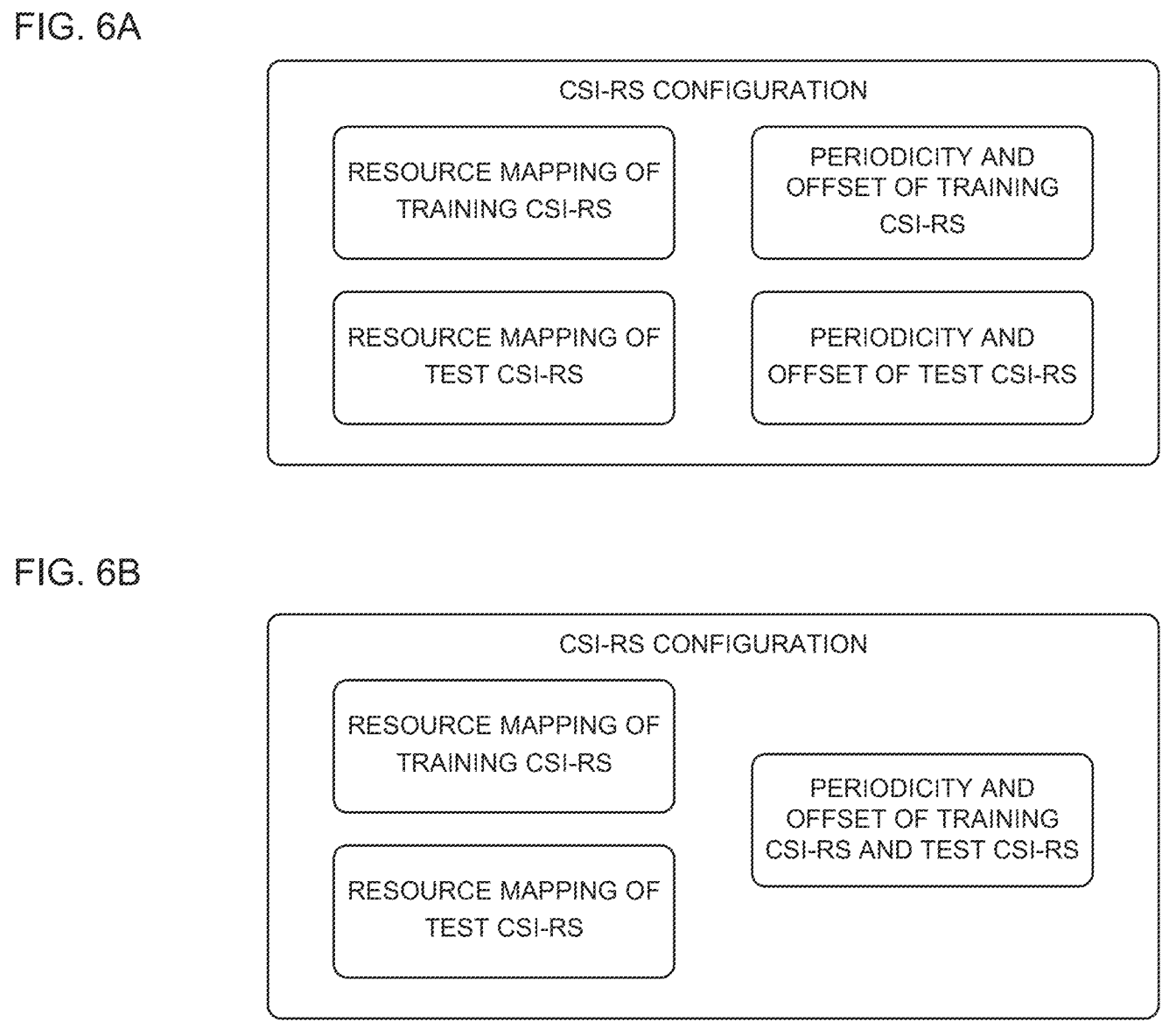

CSI-RS CONFIGURATION

RESOURCE MAPPING OF TRAINING CSI-RS

PERIODICITY AND OFFSET OF TRAINING CSI-RS

RESOURCE MAPPING OF TEST CSI-RS

PERIODICITY AND OFFSET OF TEST CSI-RS

FIG. 6B

CSI-RS CONFIGURATION

RESOURCE MAPPING OF TRAINING CSI-RS

PERIODICITY AND OFFSET OF TRAINING CSI-RS AND TEST CSI-RS

RESOURCE MAPPING OF TEST CSI-RS

CONFIGURATION OF TRAINING CSI-RS OR TEST CSI-RS

DIFFERENCE BETWEEN DENSITIES OF TRAINING CSI-RS AND TEST CSI-RS

FIG. 8

FREQUENCY

PRB

PRB INCLUDING CSI-RS

DATA

```
CSI-RS-ResourceMapping ::=
    frequencyDomainAllocation
    nrofPortsforinput
    nrofPortsforoutput
    antennaportposition
    density
        dot25
        dot33
        dot5
        one
        three
        spare
    },
    ...
}

SEQUENCE {
    CHOICE {...},
    ENUMERATED(p1,p2,p4,p8,p12,....),
    ENUMERATED(p1,p2,p4,p9,p12,....),
    CHOICE {...},
    CHOICE {
        ENUMERATED {n1, n2, n3, n4},
        ENUMERATED {n1, n2, n3},
        ENUMERATED {evenPRBs, oddPRBs},
        NULL,
        NULL,
        NULL
```

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+(plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Regarding future radio communication technology, utilizing artificial intelligence (AI) technology such as machine learning (ML) for control, management, and the like of a network/device has been under study.

However, in using an ML model in radio communication, intensive studies as to which entity implements the ML model, which entity trains the ML model, and the like have not yet been carried out. Unless these are appropriately defined, high-accuracy channel estimation/high-efficiency use of resources cannot be achieved, which may hinder enhancement of communication throughput or communication quality.

In view of this, the present disclosure has one object to provide a terminal, a radio communication method, and a base station that enable implementation of high-accuracy channel estimation, high-efficiency use of resources, and the like.

Solution to Problem

A terminal according to one aspect of the present disclosure includes a receiving section that receives a channel state information reference signal (CSI-RS), and a control section that performs, by using a machine learning model trained based on first configuration of the CSI-RS, control of performing prediction based on second configuration of the CSI-RS.

Advantageous Effects of Invention

According to one aspect of the present disclosure, high-accuracy channel estimation, high-efficiency use of resources, and the like can be implemented.

BRIEF DESCRIPTION OF DRAWINGS

FIGS. 6A and 6B are diagrams to show examples of CSI-RS configurations according to a third embodiment.

FIG. 8 is a diagram to show yet another example of CSI-RS configuration according to the third embodiment.

DESCRIPTION OF EMBODIMENTS (Application of Artificial Intelligence (AI) Technology to Radio Communication)

Regarding future radio communication technology, utilizing AI technology for control, management, and the like of a network/device has been under study.

For example, regarding future radio communication technology, increasing accuracy of channel estimation (which may be referred to as channel measurement) has been desired for beam management, decoding of a receive signal, and the like in communication using beams in particular.

For example, channel estimation may be performed using at least one of a channel state information reference signal (CSI-RS), a synchronization signal (SS), a synchronization signal/broadcast channel (Synchronization Signal/Physical Broadcast Channel (SS/PBCH)) block, a demodulation reference signal (DMRS), a reference signal for measurement (Sounding Reference Signal (SRS)), and the like.

In radio communication technology thus far, in order to perform high-accuracy channel estimation, a large amount of resources for estimation (for example, resources for transmitting reference signals) are required, and channel estimation is required for all of antenna ports used.

Figure 1:
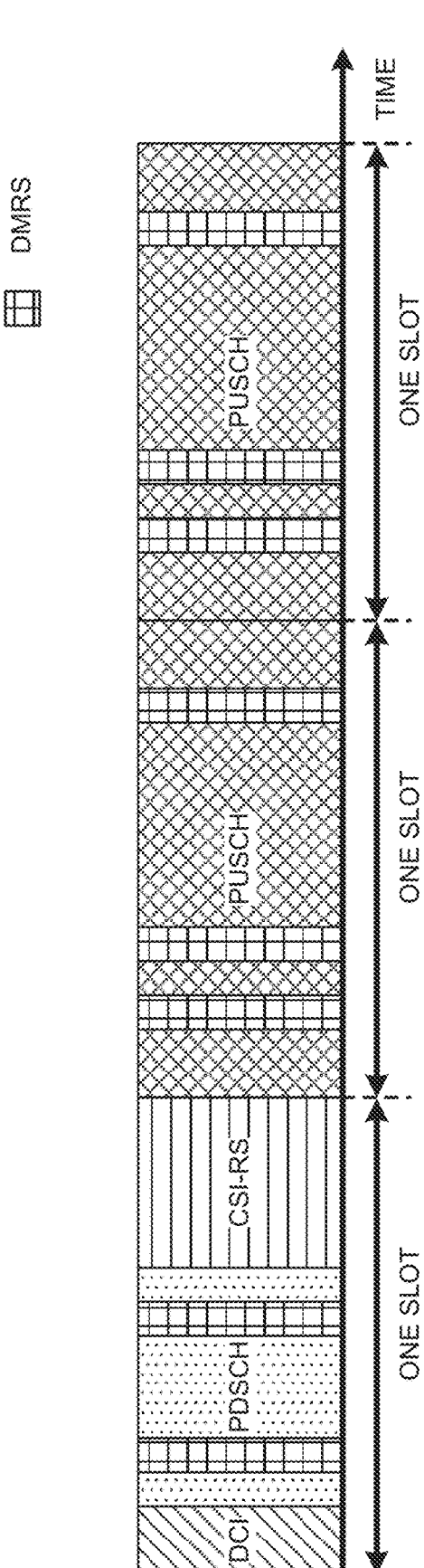
FIG. 1 is a diagram to show an example of resources for estimation.

FIG. 1 is a diagram to show an example of resources for estimation. In the present example, a resource structure of three slots in communication of NR is shown. For example, in a first slot, a terminal (also referred to as a user terminal, a User Equipment (UE), or the like) receives downlink control information (DCI) for scheduling a downlink shared channel (Physical Downlink Shared Channel (PDSCH)), an uplink shared channel (Physical Uplink Shared Channel (PUSCH)), and the like, a PDSCH, a DMRS for the PDSCH, and a CSI-RS. In each of second and third slots, the UE transmits a PUSCH and a DMRS for the PUSCH.

When resources such as the DMRS and the CSI-RS are increased in order to implement high-accuracy channel estimation, resources for data transmission and reception (for example, PDSCH resources and PUSCH resources) are reduced.

Studies are carried out on future implementation of high-accuracy channel estimation using less resources, by means of AI technology such as machine learning (ML). Such channel estimation may be referred to as AI-aided estimation.

However, in using an ML model in radio communication, intensive studies as to which entity implements the ML model, which entity trains the ML model, and the like have not yet been carried out. Unless these are appropriately defined, high-accuracy channel estimation/high-efficiency use of resources cannot be achieved, which may hinder enhancement of communication throughput or communication quality.

In view of this, the inventors of the present invention came up with the idea of a method of using an ML model regarding a physical layer (Physical (PHY) layer) in particular.

In one embodiment of the present disclosure, the UE/base station (Base Station (BS)) performs training of the ML model in a training mode, and implements the ML model in a test mode (also referred to as a testing mode or the like). In the test mode, verification (validation) of accuracy of the ML model (trained ML model) trained in the training mode may be performed.

In the present disclosure, the UE/BS may input channel state information, a reference signal measurement value, and the like to the ML model, and output high-accuracy channel state information/measurement value/beam selection/position and the like therefrom.

Note that, in the present disclosure, AI may be interpreted as an object (also referred to as an object, an object, data, a function, a program, or the like) that has (implements) at least one of the following features:

estimation based on observed or collected information, selection based on observed or collected information, prediction based on observed or collected information.

In the present disclosure, the object may be, for example, an apparatus, a device, or the like, such as the terminal and the base station. The object may be a program included in the apparatus.

In the present disclosure, the ML model may be interpreted as an object that has (implements) at least one of the following features:

generating an estimation value by being fed with information, predicting an estimation value by being fed with information, finding a feature by being fed with information, selecting an operation by being fed with information.

In the present disclosure, the ML model may be interpreted as at least one of an AI model, predictive analytics, a predictive analytics model, and the like. The ML model may be derived using at least one of regression analysis (for example, linear regression analysis, multiple regression analysis, or logistic regression analysis), a support vector machine, a random forest, a neural network, deep learning, and the like. In the present disclosure, the model may be interpreted as at least one of an encoder, a decoder, a tool, and the like.

The ML model outputs information of at least one of an estimation value, a prediction value, a selected operation, a class, and the like, based on input information.

In the ML model, supervised learning, unsupervised learning, reinforcement learning, and the like may be included. Supervised learning may be used for learning general rules of mapping input to output. Unsupervised learning may be used for learning features of data. Reinforcement learning may be used for learning an operation for maximizing a target (goal).

Each embodiment to be described later will be described mainly on an assumption of a case in which supervised learning is used for the ML model, but this is not restrictive.

In the present disclosure, "A/B" and "at least one of A and B" may be interchangeably interpreted as each other.

In the present disclosure, activate, deactivate, indicate (or specify), select, configure, update, determine, and the like may be interchangeably interpreted as each other. In the present disclosure, to support, to control, to be able to control, to operate, and to be able to operate may be interchangeably interpreted as each other.

In the present disclosure, radio resource control (RRC), an RRC parameter, an RRC message, a higher layer parameter, an information element (IE), and a configuration may be interchangeably interpreted as each other. In the present disclosure, a Medium Access Control control element (MAC Control Element (CE)), an update command, and an activation/deactivation command may be interchangeably interpreted as each other.

In the present disclosure, an index, an ID, an indicator, and a resource ID may be interchangeably interpreted as each other. In the present disclosure, a sequence, a list, a set, a group, a cluster, a subset, and the like may be interchangeably interpreted as each other.

In the present disclosure, implement, use, operate, execute, and the like may be interchangeably interpreted as each other. In the present disclosure, a test, after-training, real use, actual use, and the like may be interchangeably interpreted as each other. A signal may be interchangeably interpreted as a signal/channel.

In the present disclosure, the training mode may be a mode in which the UE/BS transmits/receives a signal for the ML model (that is, an operation mode in a training period). In the present disclosure, the test mode may be a mode in which the UE/BS implements the ML model (for example, implements the trained ML model and predicts output) (that is, an operation mode in a test period).

In the present disclosure, the training mode may mean, with respect to a specific signal to be transmitted in the test mode, a mode in which the specific signal having large overhead (for example, having a large amount of resources) is transmitted.

In the present disclosure, the training mode may mean a mode in which first configuration (for example, first DMRS configuration or first CSI-RS configuration) is referred to. In the present disclosure, the test mode may mean a mode in which second configuration (for example, second DMRS configuration or second CSI-RS configuration), which is different from the first configuration, is referred to. In the first configuration, at least one of time resources, frequency resources, code resources, and ports (antenna ports) related to measurement may be configured in a larger amount than in the second configuration.

Embodiments according to the present disclosure will be described in detail with reference to the drawings as follows.

The radio communication methods according to respective embodiments may each be employed individually, or may be employed in combination.

In the following embodiments, the ML model related to communication between the UE and the BS will be described, and related entities are thus the UE and the BS. However, application of each embodiment of the present disclosure is not limited to this. For example, regarding communication between other entities (for example, communication between UEs), the UE and the BS in the following embodiments may be replaced with a first UE and a second UE. In other words, the UE, the BS, and the like in the present disclosure may each be replaced with any UE/BS.

(Radio Communication Method)

First Embodiment

A first embodiment relates to an ML model for AI-aided CSI-RS estimation.

Figure 2:
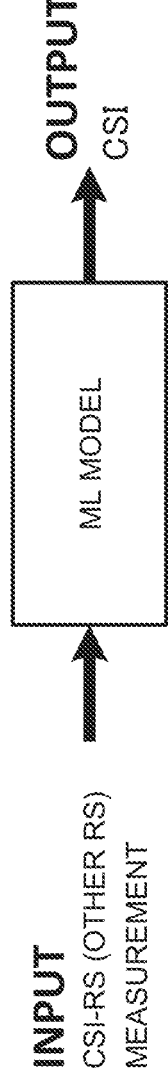
FIG. 2 is a diagram to show an example of a structure of an ML model according to a first embodiment.

FIG. 2 is a diagram to show an example of a structure of the ML model according to the first embodiment. Input of the ML model is (results of) CSI-RS measurement, and output thereof is channel state information (CSI). Note that, regarding the input of the ML model, (results of) another reference signal measurement may be included, together with or instead of (results of) CSI-RS measurement. In the following description of the present disclosure, the input of the ML model is (results of) CSI-RS measurement only, but this is not restrictive.

The CSI as the output may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), L1-RSRP (reference signal received power in layer 1 (Layer 1 Reference Signal Received Power)), L1-RSRQ (Reference Signal Received Quality), an L1-SINR (Signal to Interference plus Noise Ratio), an L1-SNR (Signal to Noise Ratio), and the like.

In the present disclosure, the CSI may be interchangeably interpreted as a CSI report.

Figures 3A, 3B:
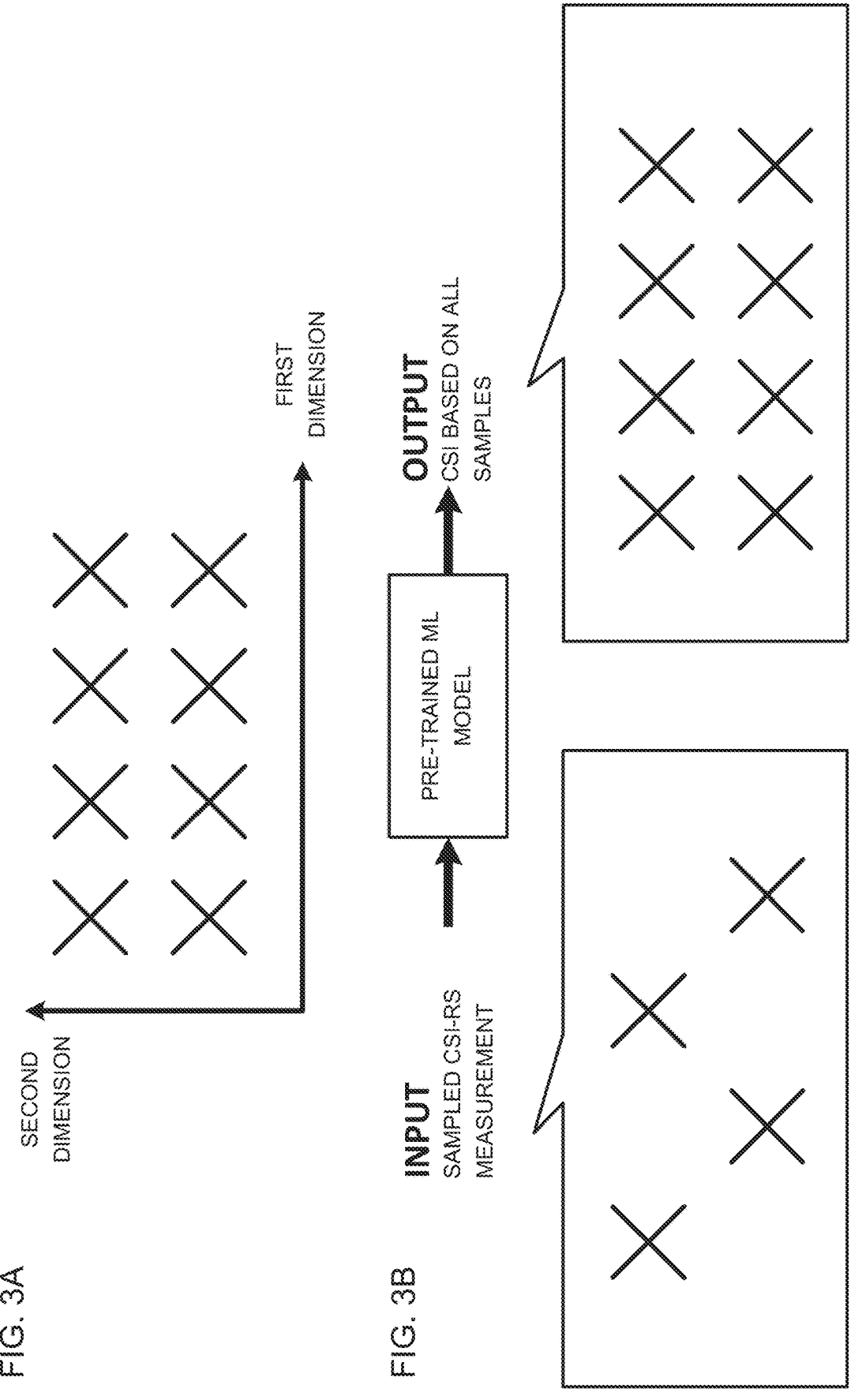
FIGS. 3A and 3B are diagrams to show examples of training of the ML model.

FIGS. 3A and 3B are diagrams to show examples of training of the ML model. FIG. 3A is a diagram to show an example of antenna ports of the CSI-RS transmitted during the training. As shown in the figure, the antenna ports of the CSI-RS (hereinafter also referred to as CSI-RS ports) may be structured such that the number of ports in a first dimension direction is a first number and the number of ports in a second dimension direction is a second number. The first dimension and the second dimension may be a horizontal direction, a vertical direction, and the like, but are not limited to these.

In the present disclosure, description will be given based on an assumption that the CSI-RS ports correspond to a cross-polarized two dimension antenna array (cross-polarized 2D antenna array), but this is not restrictive.

Note that the CSI-RS transmitted in the training period may be referred to as a training CSI-RS. The training CSI-RS may be transmitted using all of the CSI-RS ports that may be used, or may be transmitted using a part of the CSI-RS ports (or, transmission using all of the CSI-RS ports may be performed by performing a plurality of times of transmission using a part of the CSI-RS ports).

Note that, in the radio resources other than the CSI-RS in the training period, another RS, another signal, or the like may be transmitted.

FIG. 3B shows an example of the training of the ML model using the CSI-RS of FIG. 3A. In the present example, the training is implemented so that, when measurement results of the CSI-RS sampled from the training CSI-RS of FIG. 3A are input to a pre-trained ML model, CSI based on all of the samples of the training CSI-RS of FIG. 3A is output. In other words, the ML model may be trained so as to reproduce high-density CSI-RS measurement results from low-density CSI-RS measurement results.

In the present disclosure, "density" may mean density or number of at least one of time resources, frequency resources, code resources, ports (antenna ports). In the present disclosure, the resource may mean a resource/port, and the port may mean a resource/port.

The input of FIG. 3B may be measurement results based on the CSI-RS obtained by extracting a part of time resources/frequency resources/code resources/ports from the training CSI-RS, for example.

Note that, in FIG. 3B, CSI-RS measurement results based on ports located at positions corresponding to one color in a check pattern among the ports of FIG. 3A are fed as the input, but this is not restrictive. A person skilled in the art can naturally understand that the training can be performed by feeding results of any CSI-RS resource/port (for example, only one port may suffice) of FIG. 3A as the input.

One or any combination of measurement results based on a high-density CSI-RS, estimation results based on a low-density CSI-RS extracted from the high-density CSI-RS, density/resource information of the high-density CSI-RS, and density/resource information of the low-density CSI-RS may be teaching data for the ML model.

Figures 4A, 4B:
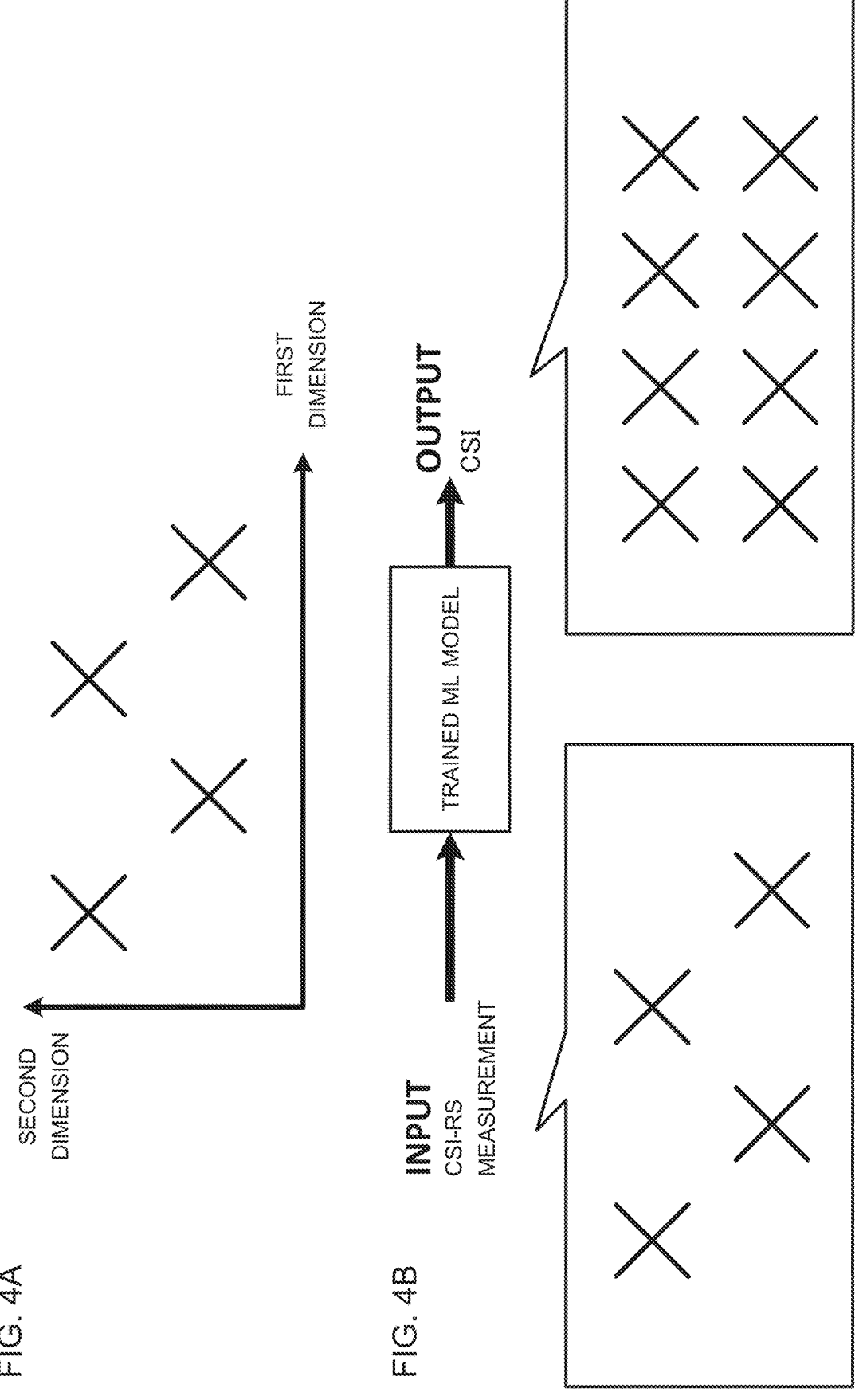
FIGS. 4A and 4B are diagrams to show examples of a test of the ML model.

FIGS. 4A and 4B are diagrams to show examples of a test of the ML model. FIG. 4A is a diagram to show an example of CSI-RS ports transmitted during the test. In the example of FIG. 4A, the CSI-RS is transmitted using ports located at positions corresponding to one color in a check pattern among the ports of FIG. 3A. Note that, this is not restrictive, and the CSI-RS may be transmitted in any resource/port in the test period.

Note that the CSI-RS transmitted in the test period may be referred to as a test CSI-RS. Density of the test CSI-RS may be different from density of the training CSI-RS. In other words, CSI-RS density may be different based on whether the mode is the training mode or the test mode. For the sake of reduction of communication overhead related to the CSI-RS, it is preferable that test CSI-RS density be lower than training CSI-RS density.

Note that, in the radio resources other than the CSI-RS in the test period, the PDSCH/PUSCH may be transmitted, or another RS may be transmitted. When density of the test CSI-RS is lower than density of the training CSI-RS, more radio resources can be used for data transmission (PDSCH/PUSCH), and therefore increase of communication throughput can be expected.

It is preferable that the test CSI-RS be a CSI-RS having at least partially the same (overlapping) time resources/frequency resources/code resources/ports of the training CSI-RS.

FIG. 4B shows an example of the test of the ML model using the CSI-RS of FIG. 4A. In the present example, the test is implemented so that, when measurement results of the CSI-RS of FIG. 4A are input to the ML model trained in the training mode, CSI corresponding to the CSI based on all of the samples of the training CSI-RS is output. When output results (prediction value) thereof fall within a given range of errors in comparison to the CSI (expectation value) based on all of the samples of the training CSI-RS, it may be determined that the trained ML model is adapted for actual use, and the test may be completed.

Note that, in the present disclosure, the test mode may be a mode for performing an operation in which channel estimation is performed based on the CSI-RS having density different from that of the training mode.

According to the first embodiment described above, the ML model that predicts high-density CSI-RS measurement results from low-density CSI-RS measurement results can be suitably generated. By applying channel estimation using the ML model, the amount of radio resources for the CSI-RS can be reduced, and therefore increase of communication throughput can be expected.

Second Embodiment

A second embodiment relates to implementation of AI-aided CSI-RS estimation in the UE.

Figure 5:
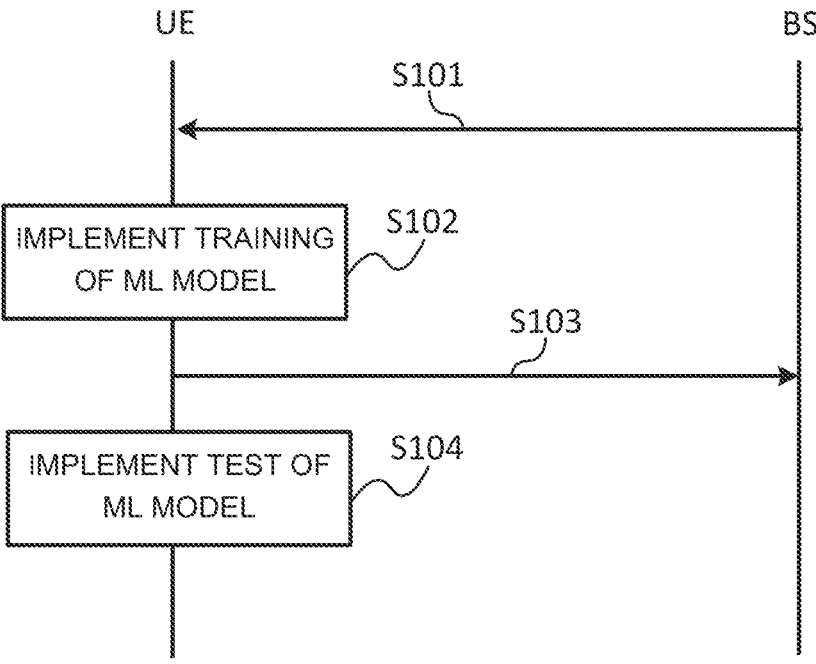
FIG. 5 is a diagram to show an example of a sequence for AI-aided CSI-RS estimation in a UE according to a second embodiment.

FIG. 5 is a diagram to show an example of a sequence for the AI-aided CSI-RS estimation in the UE according to the second embodiment. The UE receives information of a pre-trained ML model from the BS (Step S101). Note that, if the UE already has the information of the pre-trained ML model (is configured with/stores the information in advance, for example), Step S101 may be omitted.

As illustratively described in FIGS. 3A and 3B, the UE implements training of the ML model, based on the training CSI-RS received (Step S102).

The UE reports recommended CSI-RS resource allocation information (for example, recommended CSI-RS density) to the BS (Step S103). The BS may transmit information for configuring more preferable (for example, low-density) CSI-RS resources to the UE, based on the information. Note that Step S103 may be omitted.

As illustratively described in FIGS. 4A and 4B, the UE implements a test of the ML model trained in Step S102, based on the test CSI-RS received (Step S104). In other words, the UE estimates a channel, based on the test CSI-RS having density different from the training CSI-RS used in Step S102.

In Step S104, the UE may transmit CSI output from the ML model to the BS.

According to the second embodiment described above, the AI-aided CSI-RS estimation in the UE can be appropriately implemented.

Third Embodiment

A third embodiment relates to configurations of the training CSI-RS and the test CSI-RS.

[Structures of CSI-RS Configurations]

The UE may be notified of information of the CSI-RS configuration, using higher layer signaling (for example, RRC signaling or a MAC CE), physical layer signaling (for example, DCI), or a combination of these.

FIGS. 6A and 6B are diagrams to show examples of the CSI-RS configurations according to the third embodiment. FIG. 6A shows CSI-RS configuration (which may be referred to as enhanced CSI-RS configuration), which includes configuration of the training CSI-RS and configuration of the test CSI-RS. Note that resource mapping information (for example, an RRC information element "CSI-RS-ResourceMapping") for configuring resource element (RE) mapping of the CSI-RS resources in the time and frequency domains and periodicity and offset information (for example, an RRC information element "CSI-Resource-PeriodicityAndOffset") for configuring periodicity and an offset of the CSI-RS resources may be configured regarding each of the CSI-RSs.

In FIG. 6A, the periodicity and offset information is configured separately for the training CSI-RS and the test CSI-RS, but this is not restrictive. FIG. 6B shows an example in which the periodicity and offset information is configured for the training CSI-RS and the test CSI-RS in common.

Figures 7A, 7B:
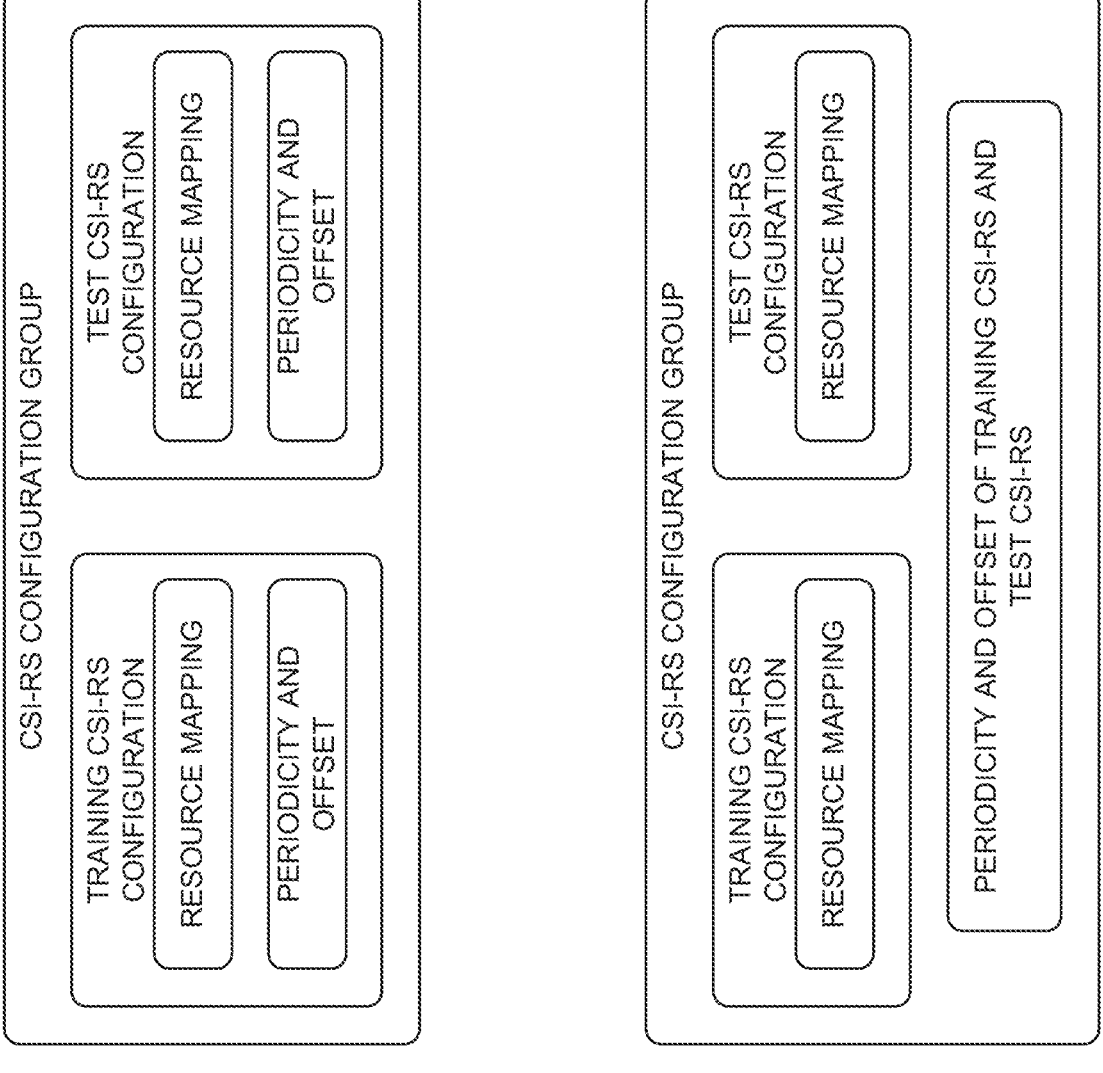
FIGS. 7A and 7B are diagrams to show other examples of CSI-RS configurations according to the third embodiment.

FIGS. 7A and 7B are diagrams to show other examples of the CSI-RS configurations according to the third embodiment. FIG. 7A shows an example in which the training CSI-RS configuration and the test CSI-RS configuration are configured as separate pieces of configuration information. These configurations may be included in one piece of CSI-RS configuration group information, or may be implicitly mapped to one group (may be associated as one group). The mapping may be determined in a specification in advance, or may be configured by the UE, using higher layer signaling (for example, RRC signaling).

In FIG. 7A, the periodicity and offset information is configured separately for the training CSI-RS and the test CSI-RS, but this is not restrictive. FIG. 7B shows an example in which the periodicity and offset information is configured for the training CSI-RS and the test CSI-RS in common.

Figure 8:
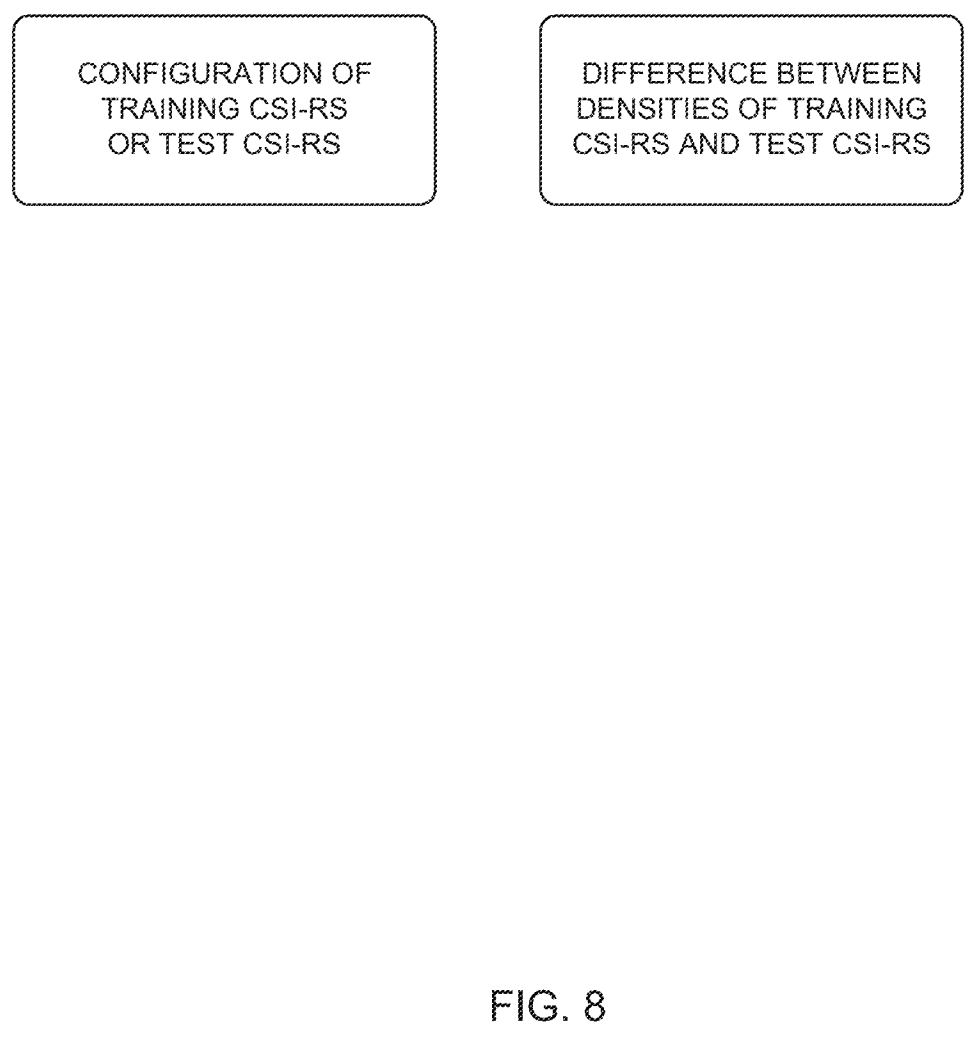

FIG. 8 is a diagram to show yet another example of the CSI-RS configuration according to the third embodiment. In the present example, one of the configuration of the training CSI-RS and the configuration of the test CSI-RS may be configured, and from the configured one, information (for example, information of a difference between the both) for deriving the other may be configured.

In the case of FIG. 8, a rule for derivation (for example, a difference, a ratio, a sampling pattern, or a mapping pattern) may be determined in a specification in advance, or may be notified to the UE, using higher layer signaling/physical layer signaling.

A difference (offset) between the density of the training CSI-RS and the density of the test CSI-RS or a ratio of the other to one of these (for example, 1/n (n is an integer, a decimal fraction, or the like) of the density of the training CSI-RS is the density of the test CSI-RS) may be determined in a specification in advance, or may be notified to the UE, using higher layer signaling/physical layer signaling. For example, when the UE that has received the configuration of the training CSI-RS does not receive the configuration of the test CSI-RS, the UE may determine the density of the test CSI-RS, based on the density of the training CSI-RS.

When a part of resources are sampled (that is, left) from one of the training CSI-RS and the test CSI-RS such that the other is obtained, or when conversion is performed from the resources of the one in accordance with a specific mapping pattern such that the resources of the other are obtained, the sampling pattern or the mapping pattern may be determined in a specification in advance, or may be notified to the UE, using higher layer signaling/physical layer signaling. These patterns will be described later.

Note that the configuration of the training CSI-RS/test CSI-RS may be determined based on a given rule (for example, a rule determined in a specification), without explicit CSI-RS configurations. For example, when the density of one of the training CSI-RS and the test CSI-RS is not configured, the density of the other may be determined regardless of (independently of) the density of the one, or the density of the other may be determined based on the density of the one.

[Report of CSI-RS Density from UE]

The UE may report at least one of the density of the training CSI-RS and the density of the test CSI-RS (or density preferable as these) to the BS. The reported density may be density not related to the CSI-RS density configured by the BS, or may be CSI-RS density based on the CSI-RS density configured by the BS.

The UE may report the density of the test CSI-RS (or density preferable as the density of the test CSI-RS) to the BS. The reported density may be density not related to the configuration of the training CSI-RS, or may be CSI-RS density based on the configuration of the training CSI-RS.

The BS that has received the report of the CSI-RS density from the UE may transmit a CSI-RS having the density based on the report or a configuration of the CSI-RS to the UE.

[Sampling/Mapping Patterns of CSI-RS]

Examples of the sampling/mapping patterns (hereinafter simply referred to as sampling patterns) described above will be described.

Figures 9A, 9B, 9C:
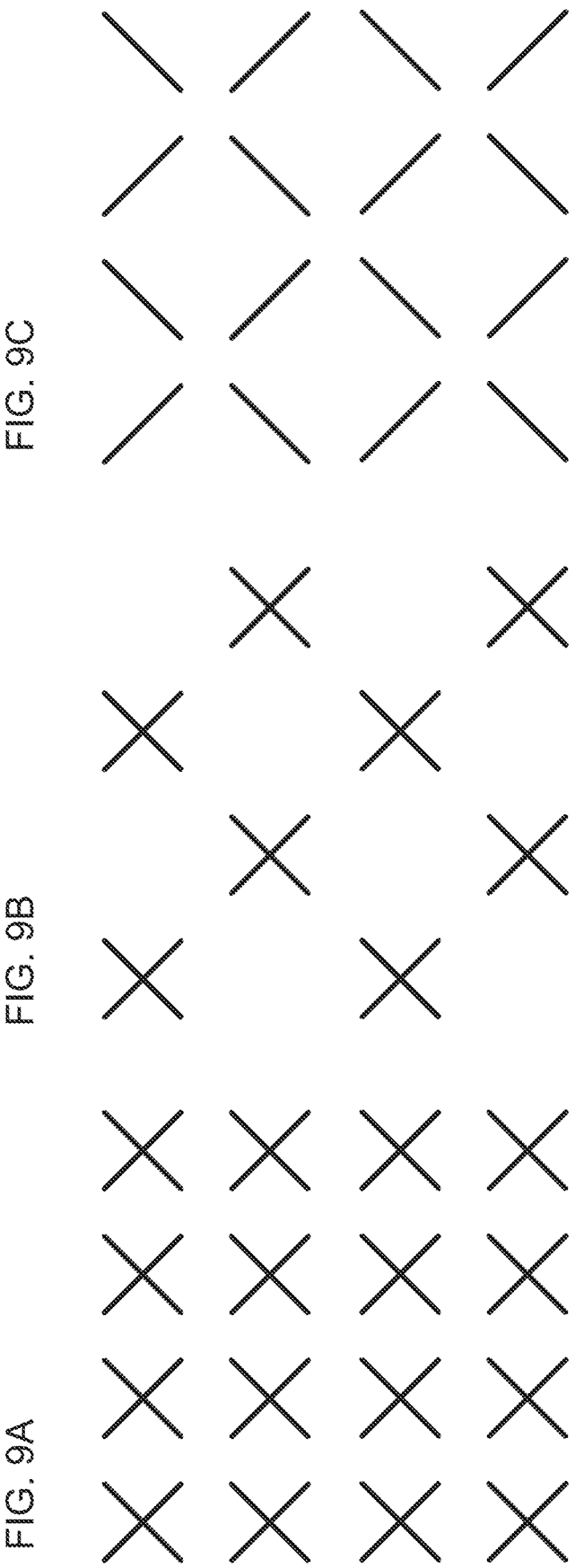
FIGS. 9A to 9C are diagrams to show examples of sampling patterns in a port domain.

FIGS. 9A to 9C are diagrams to show examples of sampling patterns in a port domain. FIG. 9A shows an example of ports used in the training CSI-RS. In the present example, 4×4 polarization pairs of ports are shown.

The UE may determine ports to be used in the test CSI-RS by performing uniform sampling on the ports used in the training CSI-RS.

In the example of FIG. 9B, sampling is performed in each polarization pair of ports. In FIG. 9B, the test CSI-RS may be received using polarization pairs of ports located at positions corresponding to one color in a check pattern (in the present example, eight polarization pairs), among the ports of FIG. 9A.

In the example of FIG. 9C, sampling is performed so that one of each polarization pair is left at each port position. In FIG. 9C, the test CSI-RS may be received using one polarization at each port position of FIG. 9A (in the present example, 16 polarizations).

These determinations of ports may be used in combination (for example, a part of ports may be determined as in FIG. 9B, and the rest of ports may be determined as in FIG. 9C).

The UE may determine ports corresponding to X (X is an integer) smallest port indexes among the ports of the training CSI-RS as the ports of the test CSI-RS.

Note that, in the present disclosure, "smallest" may be interchangeably replaced with "largest", "highest", "lowest", "of a specific value", "i-th (i is an integer, for example, 1, 2, . . . )", or the like. In the present disclosure, "small" and "large" may be interchangeably replaced with each other.

Note that, as the sampling pattern, at least one of the number of polarizations/polarization pairs/ports in the first dimension direction and the number of polarizations/polarization pairs/ports in the second dimension direction may be determined in a specification in advance, or may be notified to the UE, using higher layer signaling or the like.

The UE may determine time/frequency resources of the test CSI-RS by performing uniform sampling on time/frequency resources of the training CSI-RS.

Note that the UE may implement uniform sampling in the time/frequency domain, based on one of the following parameters or a combination of these:

a plurality of (for example, two) pieces of the periodicity and offset information configured (for example, the RRC information element "CSI-ResourcePeriodicity-AndOffset"), a plurality of density parameters configured (a parameter "density" in the resource mapping information (for example, the RRC information element "CSI-RS-Re-sourceMapping")), a scaling factor indicating a difference between the density of the training CSI-RS and the density of the test CSI-RS (common to the time and frequency domains), a scaling factor indicating a difference between the density of the training CSI-RS and the density of the test CSI-RS (individually for the time and frequency domains).

For example, the UE may perform multiplication (which may be addition/subtraction/division) of one of the density of the training CSI-RS and the density of the test CSI-RS with use of the scaling factor and thereby calculate the other. The scaling factor may be, for example, $1/n$ (n is an integer or a real number, for example, 2, 3, 4, . . . ).

When the scaling factor common to the time and frequency domains is configured, scaling is performed in these domains with the same ratio for sampling, whereas when individual scaling factors are configured, scaling can be applied in these domains with different ratios.

Note that the uniform sampling described above may be interchangeably replaced with nonuniform sampling.

[Density of CSI-RS]

In existing specifications of Rel. 15/16, the density of the CSI-RS in the frequency domain is 0.5, 1, or 3 (the unit is an RE/port/PRB).

In the present disclosure, the density of the CSI-RS may be enhanced from such an existing CSI-RS (density that cannot be covered by the existing CSI-RS may be able to be used). The enhancement of the density may be applied only when the AI-aided CSI-RS estimation is applied.

Figures 10A, 10B:
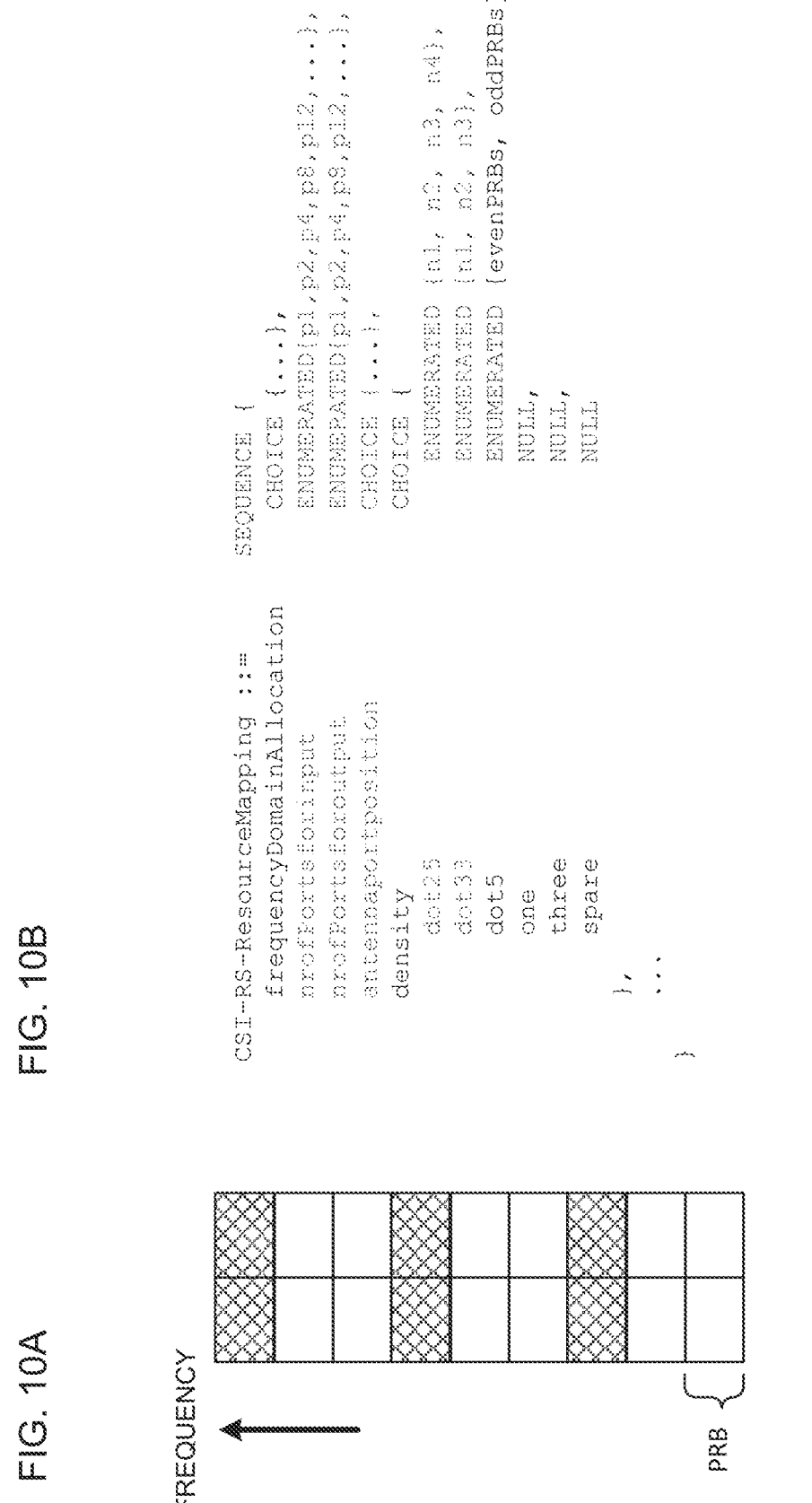
FIGS. 10A and 10B are diagrams to show examples of density of a CSI-RS in a frequency domain according to the third embodiment.

FIGS. 10A and 10B are diagrams to show examples of the density of the CSI-RS in the frequency domain according to the third embodiment. For example, FIG. 10A shows the density of the test CSI-RS in the frequency domain, in which the CSI-RS is mapped every three PRBs. The density of the CSI-RS in the frequency domain of FIG. 10A corresponds to 0.33, which is reduced from the density of the CSI-RS of Rel. 15/16.

FIG. 10B is a diagram to show an example of RRC information elements/parameters for configuring the density of the CSI-RS according to the third embodiment. The present example is shown using Abstract Syntax Notation One (ASN.1) notation (note that this is merely an example and may not be a complete description). A person skilled in the art can naturally understand meanings of the RRC information elements/parameters in the figure that have the same terms as those of the RRC information elements/parameters already defined in the specifications of Rel. 15/16 NR (TS 38.331 V16.3.1).

Note that, in the present disclosure, the terms of the RRC information elements, the RRC parameters, and the like may each be provided with a suffix (for example, "r18", "-r18", or the like), which indicates that the terms are introduced in a specific release. The suffix may not be provided, or another term may be provided.

"density" included in the resource mapping information of FIG. 10B indicates the density of the CSI-RS in the frequency domain. "dot25" and "dot33" that can be specified by the parameter correspond to density=0.25 and 0.33, respectively. "nX" (X is an integer), which is a possible value of these, indicates an offset of an RB level, and may indicate that an X-th RB out of 1/density (that is, 4 or 3) RBs is occupied by the CSI-RS. For example, the mapping of FIG. 10A may be used when "dot33"="n3".

Note that "density" may allow configuration of density lower than density=0.25, density higher than density=3, density not shown in the figure, and the like.

Note that information for the ML model may be included in the resource mapping information. For example, "nrof-Portsforinput" and "nrofPortsforoutput" included in FIG. 10B may indicate the number of antenna ports (numbers shown in the figure are 1, 2, 4, 8, 12, . . . ) associated with the input (or the training CSI-RS) and the output (or the test CSI-RS) of the ML model, respectively.

"antennaportposition" may be information related to the sampling patterns shown in FIGS. 9A to 9C.

According to the third embodiment described above, the training CSI-RS and the test CSI-RS can be appropriately configured.

Fourth Embodiment

A fourth embodiment relates to distinguishing between the training mode and the test mode.

The UE/BS may determine which mode is employed by the UE/BS, based on at least one of the following:

(4-1) report of information related to a mode to the BS, (4-2) reception of information (indication) related to a mode from the BS, (4-3) a specific rule/pattern.

The information of (4-1) may be transmitted using physical layer signaling (for example, UCI), higher layer signaling (for example, RRC signaling or a MAC CE), a specific signal/channel, or a combination of these.

The information of (4-2) may be transmitted using physical layer signaling (for example, DCI), higher layer signaling (for example, RRC signaling or a MAC CE), a specific signal/channel, or a combination of these.

The rule/pattern of (4-3) may be determined in a specification in advance, or may be notified using physical layer signaling (for example, DCI), higher layer signaling (for example, RRC signaling or a MAC CE), a specific signal/channel, or a combination of these.

The information related to a mode of (4-1) and (4-2) may be referred to as trigger information, and may include information indicating the training mode or the test mode, may include information indicating mode switching (or indicating that a mode has been switched/finished), may include information indicating that a specific mode (for example, the test mode) may be performed, or may include information indicating that operation is to be performed based on the specific rule/pattern of (4-3) after reception of the trigger information.

Note that the information related to a mode may indicate the number of samples (for example, 50, 100, or 200 samples) before completion of the training/test. The UE operating in the training (test) mode may transition to the test (training) mode after transmission/reception of the number of samples.

The information related to a mode may indicate time (for example, the number of slots (for example, 5 or 10 slots), or the number of symbols) before completion of the training/test. For example, the UE operating in the training (test) mode may transition to the test (training) mode after the elapse of the time.

Figures 11A, 11B:
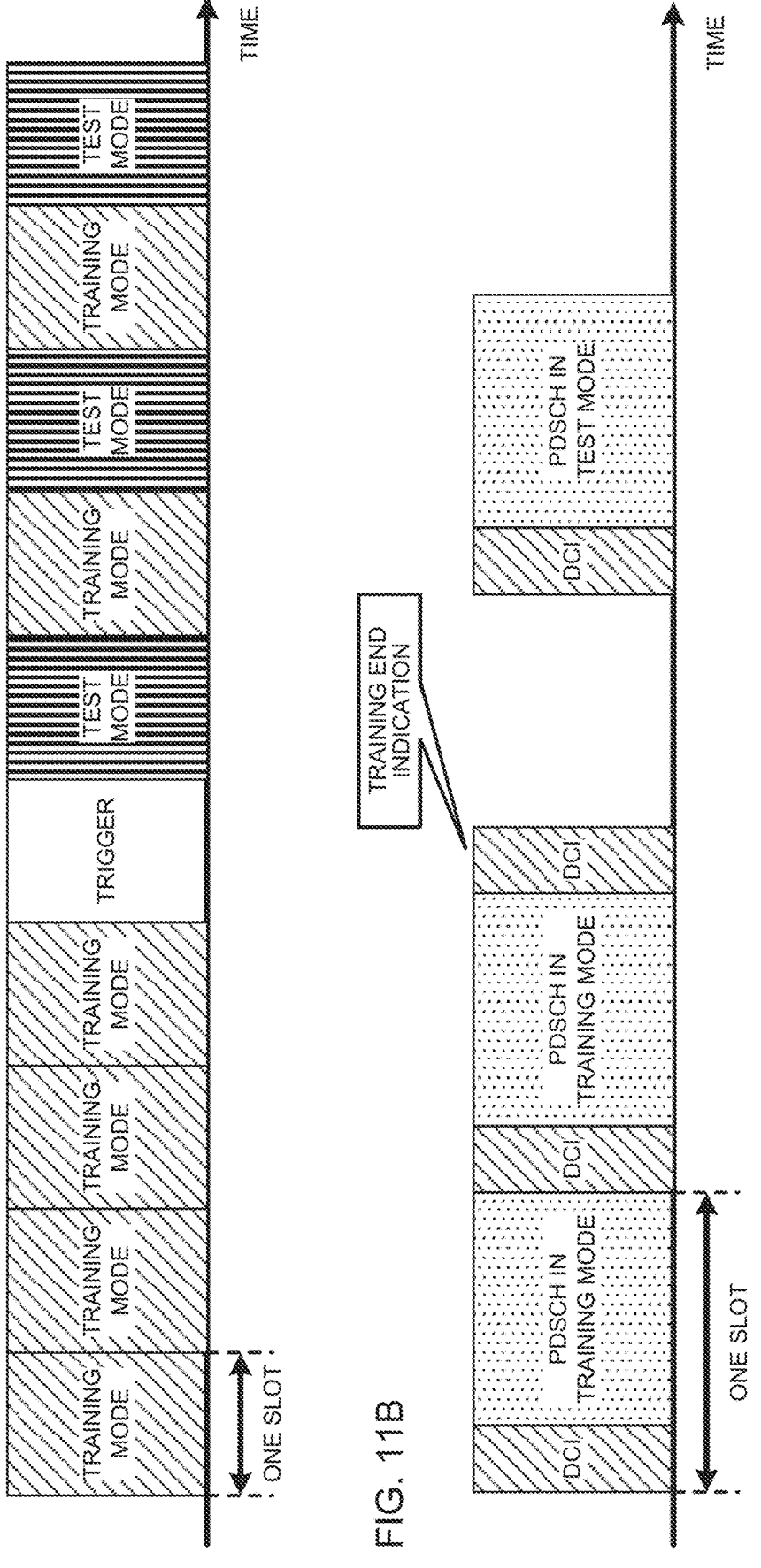
FIGS. 11A and 11B are diagrams to show examples of control of switching of modes.

FIGS. 11A and 11B are diagrams to show examples of control of switching of modes. In the present example, it is assumed that an operation of a mode can be switched in each slot.

In FIG. 11A, in first four slots shown in the figure, the UE operates in the training mode. In a fifth slot, the UE receives trigger information (for example, a MAC CE). The trigger information specifies an operation of switching between the test mode and the training mode in each slot. Note that, in FIG. 11A, a mode switching operation is performed in the next slot after reception of the trigger information. However, the start of the operation may be after the elapse of a given period of time after reception of the trigger information, or may be after transmission of an ACKnowledge (ACK) for the trigger information (or after the elapse of a given period of time after the transmission).

In FIG. 11B, the trigger information is notified based on DCI. When the UE performing operation (for example, training of the ML model for the CSI-RS) in the training mode in first two slots shown in the figure receives DCI indicating a training end indication in a third slot, the UE may operate in the test mode from the next fourth slot.

According to the fourth embodiment described above, timings of the training mode and the test mode can be appropriately controlled.

Fifth Embodiment

A fifth embodiment relates to transmission and reception of information of the ML model.

Information (hereinafter also referred to as ML model information, an ML model report, or the like) of at least one of the trained ML model and the pre-trained ML model may be transmitted/received from a given entity (UE/BS) to another entity (BS/UE/another UE/another BS).

The UE/BS may perform training/adjustment/update (for example, fine-tuning)/transfer learning of the ML model, based on information of the trained or pre-trained ML model being received. The UE/BS may implement the ML model trained by the UE/BS and the received ML model in combination (may use output of the received ML model as input of the ML model trained by the UE/BS, for example).

Note that the pre-trained ML model may be selected from a plurality of models, based on a position of the UE/BS (position information), channel measurement results in the UE/BS, and the like. Information of the pre-trained ML model may be stored in the UE/BS in advance, or may be configured using higher layer signaling.

Performance information (performance report) of the ML model may be transmitted/received from a given entity to another entity. The performance report may be transmitted together with the ML model information, or may be transmitted separately therefrom. The performance report may include at least one of estimation (prediction) accuracy (or an error) of a given ML model, the number of samples used for training of the ML model, and the like.

Figure 12:
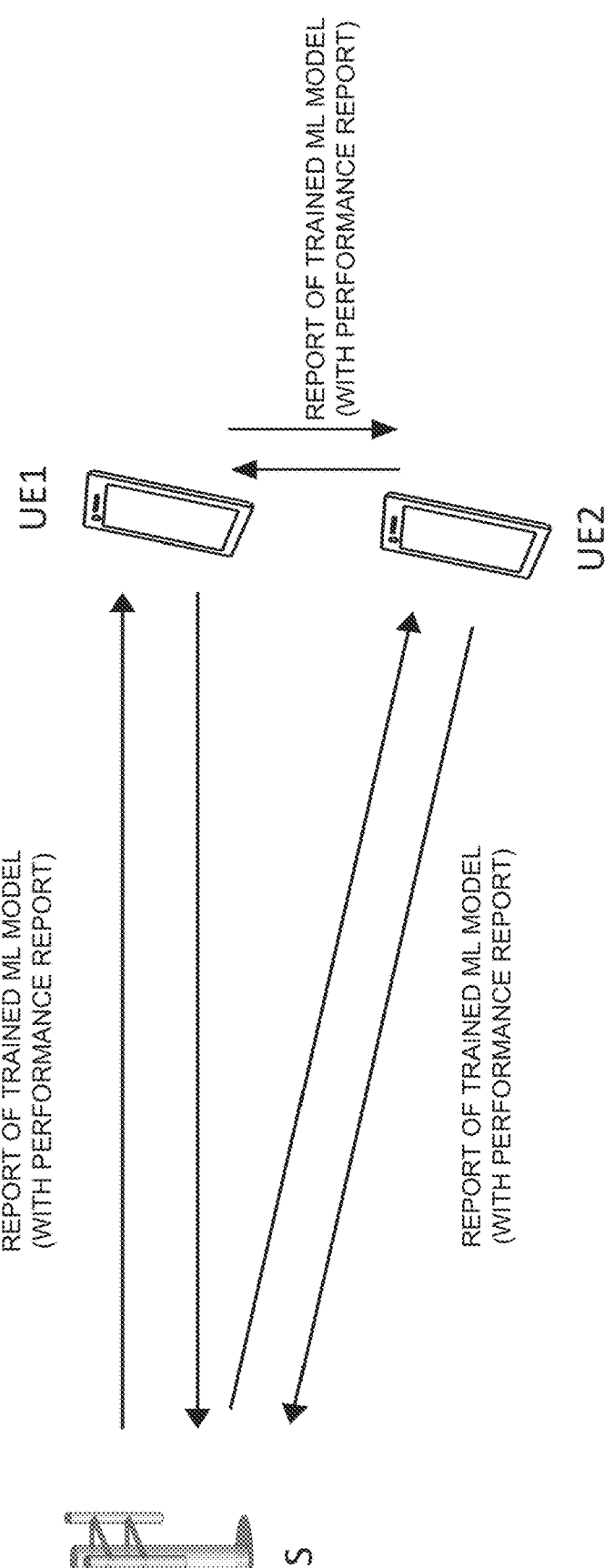
FIG. 12 is a diagram to show an example of transmission and reception of information according to a fifth embodiment.

FIG. 12 is a diagram to show an example of transmission and reception of information according to the fifth embodiment. In the present example, a trained ML model report (which may be accompanied by a performance report) may be transmitted and received between the BS and a UE1, between the BS and a UE2, between the UE1 and the UE2, and the like. Each UE/BS may use received information for updating (tuning) the ML model.

The ML model report/performance report (hereinafter also simply referred to as the ML model report) may include at least one of one or more weights used in each layer of the ML model, information of a base pre-trained ML model, information of a specific ML model (which may be referred to as a reference ML model), and a difference from the reference ML model (for example, a difference between the weights, a difference of the numbers of intermediate layers, or the like). Here, for example, when a plurality of ML models are indexed (numbered), the information of the pre-trained ML model/reference ML model may be one or more indexes of the ML models.

A parameter of the ML model indicated by the ML model report may be indicated in given granularity (unit). The granularity as the parameter of the ML model may be at least one of an input parameter, an output parameter, and an intermediate layer parameter (for example, a weight, a hyperparameter (for example, the number of intermediate layers), or the like), regarding the ML model.

Note that the granularity as the parameter of the ML model may be determined in a specification in advance (may be determined with a specific rule), or may be notified to the UE/BS, using physical layer signaling (for example, DCI or UCI), higher layer signaling (for example, RRC signaling or a MAC CE), a specific signal/channel, or a combination of these. The notified granularity may be referred to as recommended granularity, specified granularity, or the like.

The parameter of the ML model indicated by the ML model report may be represented by at least one of an absolute value and a relative value. The parameter of the ML model indicated by the ML model report may be represented by at least one of a discrete value (or a digital value) and a continuous value (or an analog value).

The ML model report may be transmitted using physical layer signaling (for example, DCI or UCI), higher layer signaling (for example, RRC signaling or a MAC CE), a specific signal/channel, or a combination of these. The ML model report/performance report may be transmitted in a cell that is the same as a cell related to the ML model (a cell in which the ML model is used), or may be transmitted in a cell that is different therefrom (for example, a cell in which the ML model is not used, a primary cell, a specific secondary cell, or the like).

The ML model report may be periodically/semi-persistently/aperiodically transmitted and received. A transmission period of the ML model report may be configured for the UE, using higher layer signaling. When periodic transmission/reception of the ML model report is configured using higher layer signaling, the UE may implement periodic transmission/reception of the ML model report. When semi-persistent transmission/reception of the ML model report is triggered using DCI, the UE may implement semi-persistent transmission/reception of the ML model report.

When aperiodic transmission and reception of the ML model report is requested (or triggered) by another UE/BS, the UE may implement transmission/reception of the ML model report. When a condition is satisfied, the UE may implement transmission/reception of the ML model report. The condition may be determined in a specification in advance, or information related to the condition may be notified from another UE/BS, using higher layer signaling or the like. The condition may be, for example, at least one of a fact that received quality (for example, Reference Signal Received Power (RSRP)) of a specific channel/signal has fallen below a threshold, a fact that a specific channel/signal has been retransmitted (or decoding thereof has failed), and the like.

Note that the UE may transmit information related to the UE (which may be referred to as UE information) to the BS, in order to prompt the BS to select the pre-trained ML model used by the UE. The UE information may be information for identifying the position of the UE, and for example, the position information of the present disclosure may include at least one of information obtained by using a positioning system such as the Global Positioning System (GPS), information (for example, an identifier (ID) of the base station/cell, a distance between the BS and the UE, a direction of the UE from the viewpoint of the BS, or the like) of a neighboring base station of the UE (or a serving base station), a specific address (for example, an Internet Protocol (IP) address) of the UE, and the like. The UE information may include a reference signal for positioning (for example, a Positioning Reference Signal (PRS), a CSI-RS, an SRS, or the like).

The UE information may include information related to its own implementation (for example, a location/position/direction of an antenna, a position/direction of an antenna panel, the number of antennas, the number of antenna panels, and the like).

According to the fifth embodiment described above, information of the ML model can be suitably shared between a plurality of apparatuses (the UE and the BS).

Sixth Embodiment

A sixth embodiment relates to report of a desired form of information for the ML model.

The UE may report a desired form of information for training of the ML model (which may be referred to as a desired information form) to another entity (BS/another UE), or may receive the desired form from another entity. The desired form may be reported using physical layer signaling (for example, DCI or UCI), higher layer signaling (for example, RRC signaling or a MAC CE), a specific signal/channel, or a combination of these.

The UE may report a desired form of information for input of the ML model (that is, information for the test of the ML model) to another entity (BS/another UE), or may receive the desired form from another entity.

Note that the desired form may mean, for example, at least one of desired density, a desired period (or offset), and the like regarding a reference signal (for example, a DMRS or a CSI-RS) measured for the training/input of the ML model.

For example, the UE may calculate a density/resource pattern that is preferable for training of the ML model (that is, that may contribute to enhancement of estimation accuracy of the ML model), based on measurement results of the CSI-RS transmitted from the BS, and report information of the preferable density/resource pattern to the BS, and the BS may transmit the CSI-RS, using the preferable density/resource pattern.

The report of the desired form of the sixth embodiment may be periodically/semi-persistently/aperiodically transmitted and received, as with the description of the ML model report of the fifth embodiment.

According to the sixth embodiment described above, specification of the structure of the reference signal for enhancement of accuracy of the ML model can be appropriately implemented.

Seventh Embodiment

A seventh embodiment relates to an application condition of the ML model.

The application condition of the ML model may be determined in a specification in advance, or may be notified to the UE/BS, using physical layer signaling (for example, DCI or UCI), higher layer signaling (for example, RRC signaling or a MAC CE), a specific signal/channel, or a combination of these.

The UE under a condition not allowing application of the ML model may assume that the UE cannot implement training of the ML model and estimation using the ML model (for example, performs an estimation operation defined in Rel. 16 or earlier versions) until a condition allowing application of the ML model is satisfied.

Note that sharing of the ML model (that is, notifying another UE of information of the ML model trained by a given UE for use) may be implemented based on at least one of the position of the UE (for example, a distance between the BS and the UE, a direction of the UE from the viewpoint of the BS, or the like), implementation of the UE (for example, the position of an antenna, the number of antennas, or the like), time that has elapsed after training, and the like.

According to the seventh embodiment described above, the ML model can be appropriately applied only to preferable UEs/BSs.

ADDITIONAL NOTES

The CSI-RS of the present disclosure may be interchangeably interpreted as a non zero power (NZP) CSI-RS, a zero power (ZP) CSI-RS, CSI-Interference Management (CSI-IM), a resource for channel measurement (Channel Measurement Resource (CMR)), a resource for interference measurement (Interference Measurement Resource (IMR)), or the like.

The CSI-RS of the present disclosure may be interpreted as an SRS. In this case, a person skilled in the art can apply an AI-aided SRS by interchangeably interpreting reception and transmission, the UE and the BS, downlink and uplink, and the like as appropriate.

At least one of the embodiments described above may be applied only to the UE that has reported a specific UE capability or that supports the specific UE capability.

The specific UE capability may indicate at least one of the following:

whether or not AI-aided PHY operation is supported,
whether or not an AI-aided CSI-RS is supported,
whether or not AI-aided CSI report is supported,
whether or not the ML model can be trained,
whether or not a capability for the pre-trained ML model can be reported,
whether or not enhanced CSI-RS resource mapping is supported,
whether or not a specific sampling pattern is supported,
whether or not notification of information of the ML model is supported,
whether or not identification of (distinguishing between) the training mode and the test mode is supported.

The UE capability may be reported in each frequency, may be reported in each frequency range (for example, Frequency Range 1 (FR1) or Frequency Range 2 (FR2)), or may be reported in each subcarrier spacing (SCS). In other words, the UE may apply control based on the ML model only to a specific frequency/FR/SCS.

The UE capability may be reported to time division duplex (TDD) and frequency division duplex (FDD) in common, or may be reported independently.

At least one of the embodiments described above may be applied when the UE is configured with specific information related to the embodiment (s) described above, using higher layer signaling. For example, the specific information may be information indicating enabling of ML model-based control, any RRC parameter for a specific release (for example, Rel. 18), or the like.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 13:
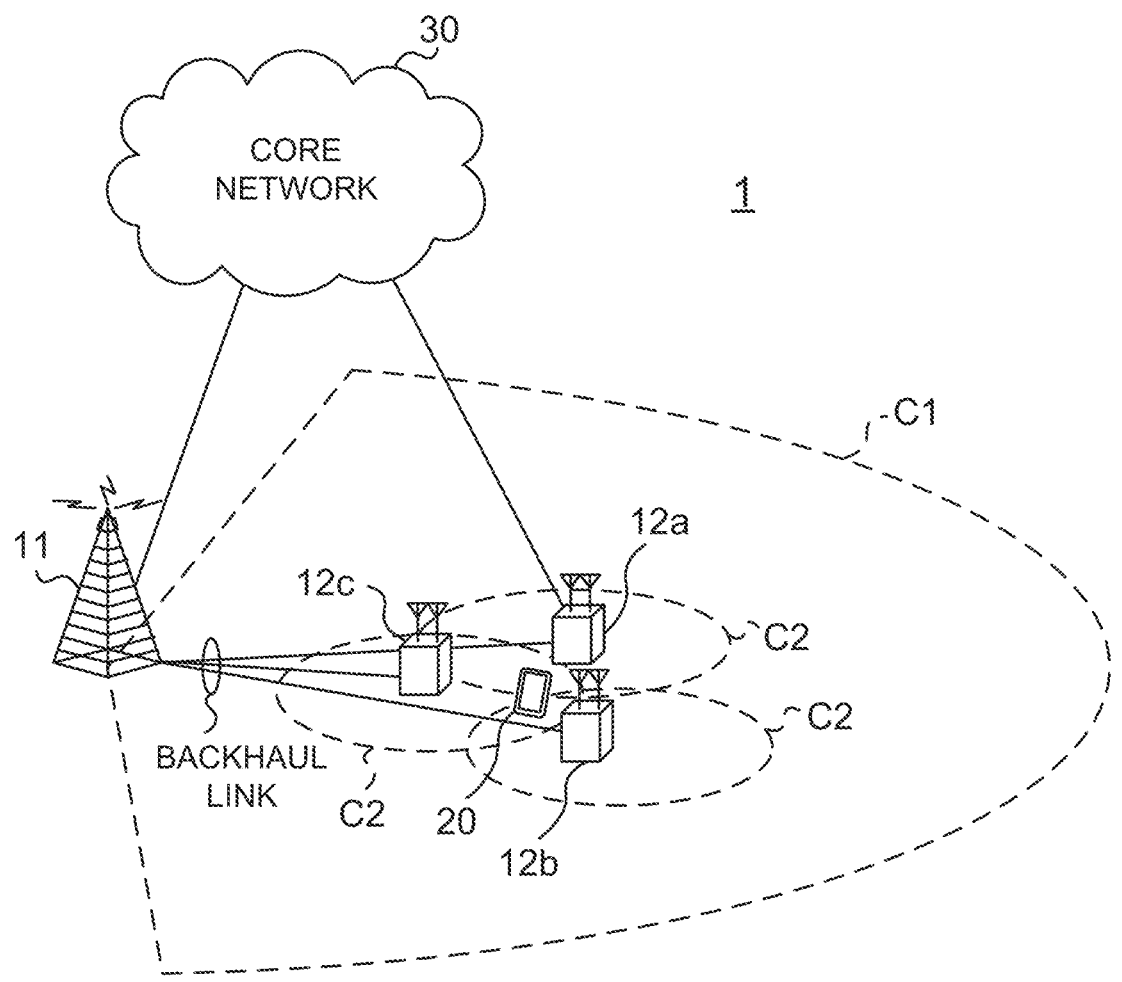
FIG. 13 is a diagram to show an example of a schematic structure of a radio communication system according to one embodiment.

FIG. 13 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHZ), and FR2 may be a frequency band which is higher than 24 GHZ (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant,"

"UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 14:
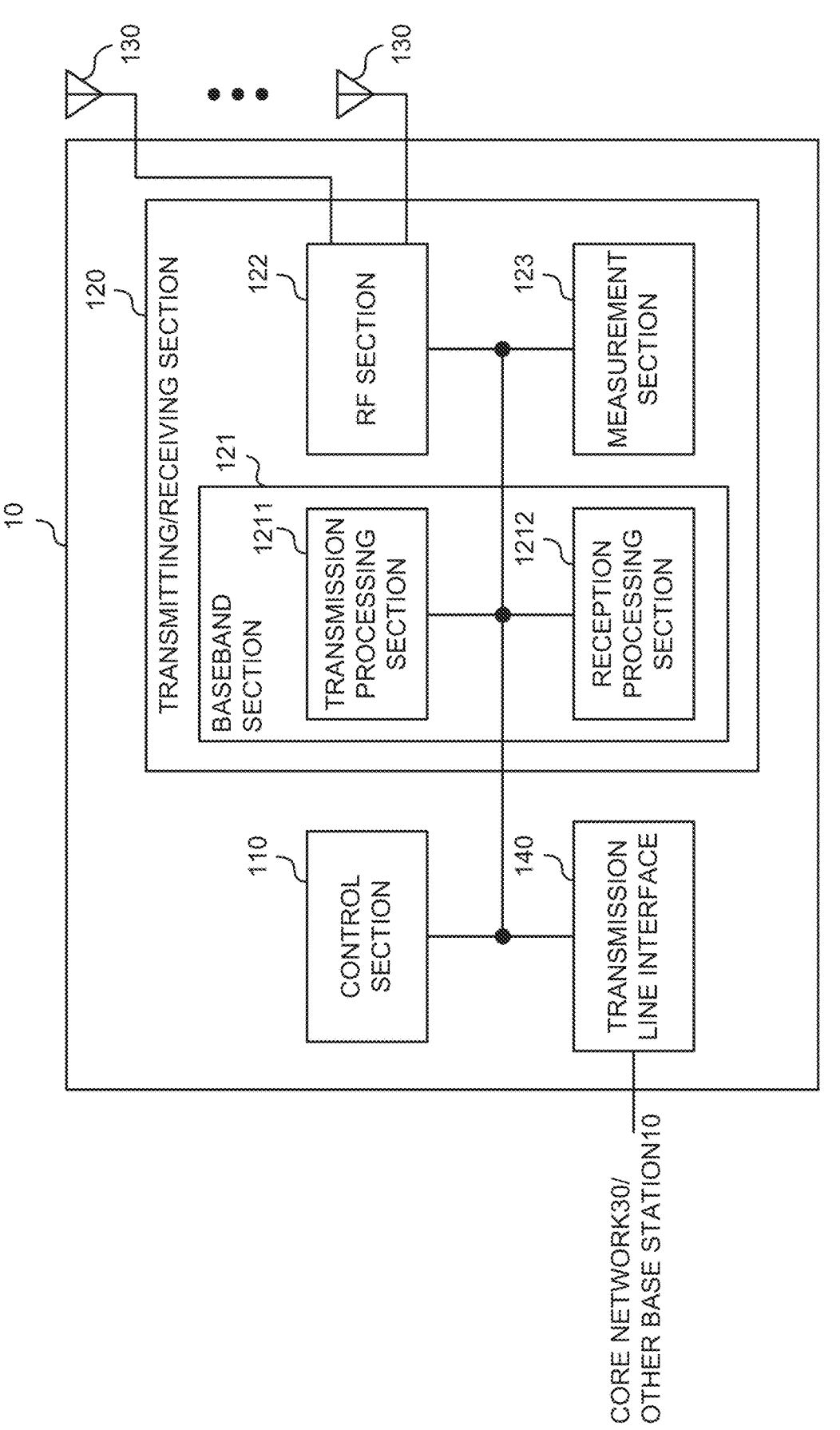
FIG. 14 is a diagram to show an example of a structure of a base station according to one embodiment.

FIG. 14 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-toanalog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit a channel state information reference signal (CSI-RS) based on first configuration for training of a machine learning model.

The control section 110 may perform, for input of the machine learning model trained based on the first configuration, control of transmitting the CSI-RS based on second configuration.

(User Terminal)

Figure 15:
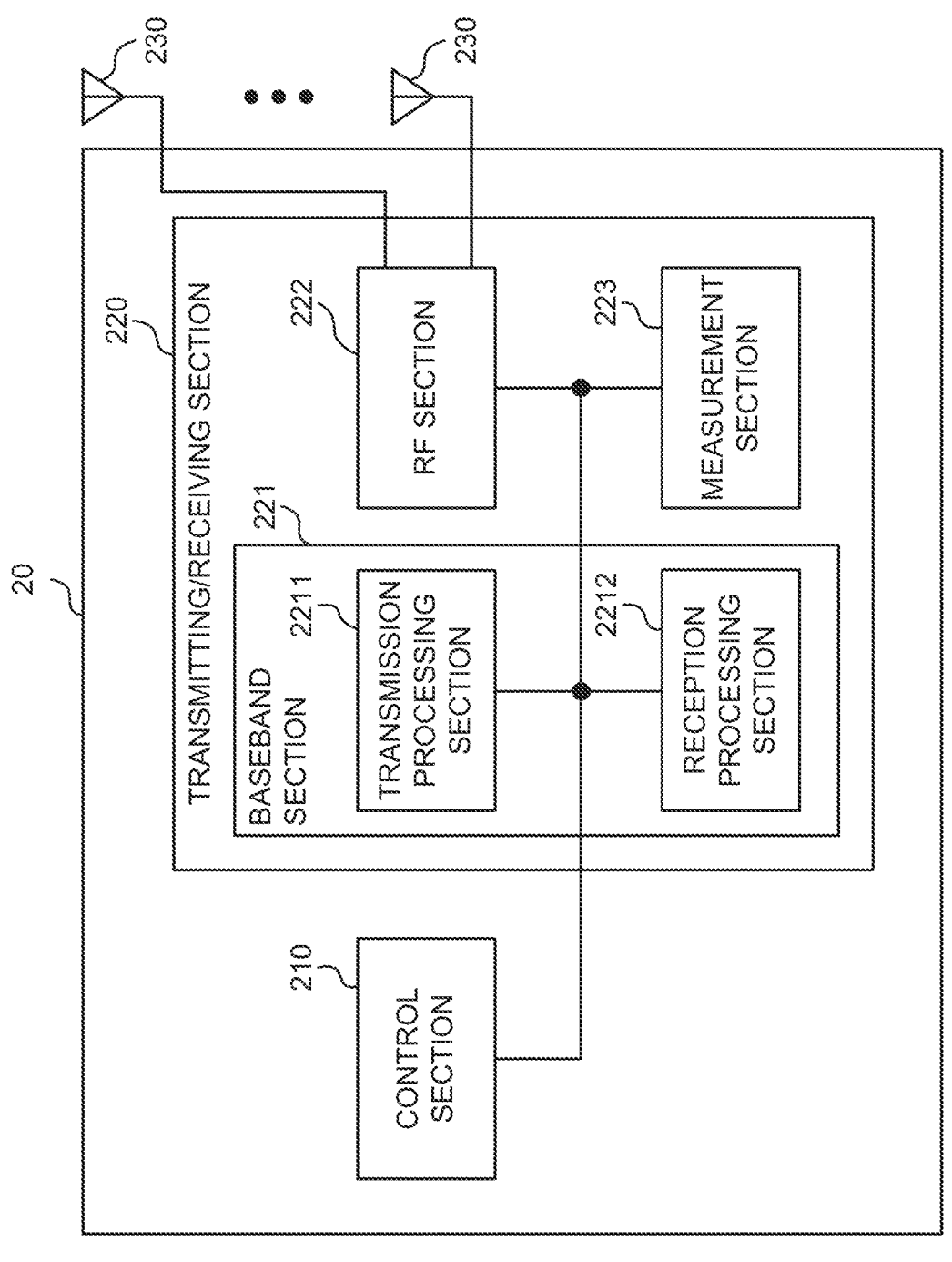
FIG. 15 is a diagram to show an example of a structure of a user terminal according to one embodiment.

FIG. 15 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

Note that the transmitting/receiving section 220 may receive a channel state information reference signal (CSI-RS).

The control section 210 may perform, by using a machine learning model trained based on first configuration (for example, configuration for a training mode) of the CSI-RS, control of performing prediction (estimation) based on second configuration (for example, configuration for a test mode) of the CSI-RS.

Density of the CSI-RS of the second configuration may be lower than density of the CSI-RS of the first configuration.

The control section 210 may determine a resource of the CSI-RS of the second configuration by sampling a resource of the CSI-RS of the first configuration.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 16:
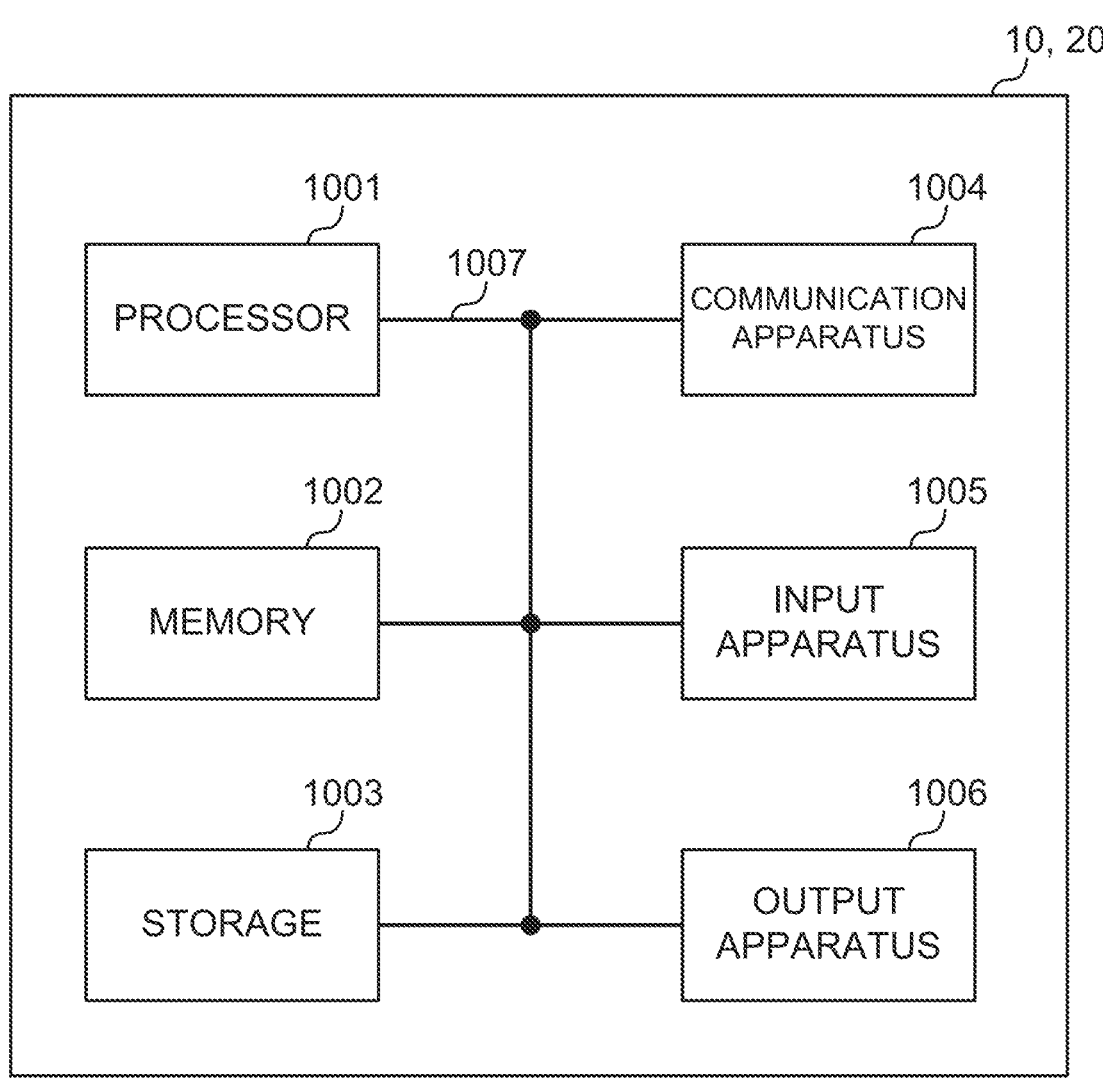
FIG. 16 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 16 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EE- PROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

VARIATIONS

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IOT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
   a receiving section that receives a channel state information reference signal (CSI-RS); and
   a control section that performs, by using a machine learning model trained based on first configuration of the CSI-RS, control of performing prediction based on second configuration of the CSI-RS,
   wherein a density of the CSI-RS of the second configuration is lower than a density of the CSI-RS of the first configuration.

2. The terminal according to claim 1, wherein the control section determines a resource of the CSI-RS of the second configuration by sampling a resource of the CSI-RS of the first configuration.

3. A radio communication method for a terminal, the radio communication method comprising:
   receiving a channel state information reference signal (CSI-RS); and
   performing control of performing, by using a machine learning model trained based on first configuration of the CSI-RS, prediction based on second configuration of the CSI-RS,
   wherein a density of the CSI-RS of the second configuration is lower than a density of the CSI-RS of the first configuration.

4. A base station comprising:
   a transmitting section that transmits a channel state information reference signal (CSI-RS) based on first configuration for training of a machine learning model; and
   a control section that performs, for input of the machine learning model trained based on the first configuration, control of transmitting the CSI-RS based on second configuration,
   wherein a density of the CSI-RS of the second configuration is lower than a density of the CSI-RS of the first configuration.

* * * * *